US011598290B2

(12) United States Patent
Lee et al.

(10) Patent No.: US 11,598,290 B2
(45) Date of Patent: Mar. 7, 2023

(54) COMBUSTOR OF LIQUID ROCKET ENGINE

(71) Applicant: KOREA AEROSPACE RESEARCH INSTITUTE, Daejeon (KR)

(72) Inventors: Keum Oh Lee, Daejeon (KR); Byoung Jik Lim, Daejeon (KR); Jun Sung Lee, Daejeon (KR); Kee Joo Lee, Daejeon (KR); Jae Sung Park, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/539,846

(22) Filed: Dec. 1, 2021

(65) Prior Publication Data

US 2023/0003178 A1    Jan. 5, 2023

(30) Foreign Application Priority Data

Jul. 2, 2021   (KR) .................. 10-2021-0087334
Nov. 4, 2021  (KR) .................. 10-2021-0150527

(51) Int. Cl.
*F02K 9/64* (2006.01)
*F02K 9/97* (2006.01)
*F02K 9/44* (2006.01)

(52) U.S. Cl.
CPC .............. *F02K 9/64* (2013.01); *F02K 9/44* (2013.01); *F02K 9/97* (2013.01)

(58) Field of Classification Search
CPC ................................. F02K 9/64; F02K 9/972
See application file for complete search history.

(56) References Cited

U.S. PATENT DOCUMENTS

| 2,705,399 A * | 4/1955 | Allen ........... F02K 9/64 239/127.3 |
| 2,933,888 A * | 4/1960 | Africano ....... F02K 9/972 60/770 |
| 3,024,606 A * | 3/1962 | Adams ......... F02K 1/822 165/51 |
| 3,086,358 A * | 4/1963 | Tumavicus .... F02K 9/972 165/169 |
| 4,879,874 A * | 11/1989 | Koyari ....... F02K 9/64 60/260 |
| 7,343,732 B2 * | 3/2008 | Hewitt ....... F02K 9/64 239/127.1 |

(Continued)

*Primary Examiner* — Lorne E Meade
(74) *Attorney, Agent, or Firm* — Rabin & Berdo, P.C.

(57) ABSTRACT

A combustor of a liquid rocket engine includes a nozzle unit including a regenerative cooling channel, in which the nozzle unit includes a fuel manifold outer shell, a combustor inner shell, and a combustor outer shell having a downward channel inlet, and the combustor includes a fuel inlet connected to a nozzle neck of the nozzle unit, a fuel manifold formed between the fuel manifold outer shell and the combustor outer shell, and in which fuel introduced from the fuel inlet flows, a downward channel connected in communication with the fuel manifold through the downward channel inlet, and extending in a downward direction from an upper portion of the combustor, a diverting manifold provided at a distal end of the nozzle unit and connected in communication with the downward channel, and an upward channel connected in communication with the diverting manifold and extending in an upward direction of the combustor.

4 Claims, 10 Drawing Sheets

(56) References Cited

U.S. PATENT DOCUMENTS

| | | | | |
|---|---|---|---|---|
| 7,854,395 B1* | 12/2010 | Jones | ........................ | F02K 9/64 |
| | | | | 239/127.1 |
| 8,689,540 B2* | 4/2014 | Haggander | ............. | F02K 9/972 |
| | | | | 60/260 |
| 11,008,977 B1* | 5/2021 | Markusic | ................... | F02K 9/46 |
| 2016/0312744 A1* | 10/2016 | Gazave | .................... | F02K 9/64 |

\* cited by examiner

COMBUSTOR OF LIQUID ROCKET ENGINE

CROSS-REFERENCE TO RELATED APPLICATIONS

This application claims priority from Korean Patent Application Nos. 10-2021-0150527 and 10-2021-0087334, filed on Nov. 4, 2021 and Jul. 2, 2021, respectively, in the Korean Intellectual Property Office, the disclosures of which are incorporated herein in their entireties.

BACKGROUND

Technical Field

The present disclosure relates to a combustor of a liquid rocket engine, and more particularly, to a combustor of a liquid rocket engine, in which a fuel manifold can be miniaturized, and which can achieve improvement of cooling efficiency and structural strength of a nozzle neck.

Background Art

A rocket is an aircraft projected by the repulsive force that is generated as high-temperature and high-pressure fuel is generated and ejected, and includes a combustor that burns the propellant, and a nozzle for accelerating the gas produced in the combustor to give direction.

Since there occurs very large heat transfer as the high-temperature and high-pressure combustion gas generated in the combustion chamber of the rocket flows along the walls of the combustion chamber, sufficient cooling is required to protect the walls. One method of protecting the combustion chamber wall surface from the high heat described above is to use a regenerative cooling method which reuses the propellant used for cooling the combustion chamber for combustion.

Meanwhile, as illustrated in FIG. 1, the related combustor of the liquid rocket engine has a structure in which a nozzle neck 100 is recessed inward in an hourglass shape, and includes a nozzle neck stiffener 200 surrounding the nozzle neck 100 in an annular shape to support the nozzle neck 100 and prevent the nozzle neck 100 having a small diameter from being damaged by the vibration of the engine.

In addition, a bell-type expanded nozzle unit 400 includes a donut-shaped fuel inlet 300 which serves to distribute the fuel compressed by the turbo pump for the regenerative cooling of an expanded nozzle unit 400 and the combustor chamber, and then inject into the combustion chamber.

However, the related combustor of the liquid rocket engine has a problem in that, since the fuel inlet is positioned at a portion having a relatively large diameter, it increases the diameter and also the weight of the combustor including the fuel manifold, and it is difficult to apply the 3D printing method to manufacture.

SUMMARY

The present disclosure has been made to solve the problems described above, and an object of the present disclosure is to provide a combustor of a liquid rocket engine, in which a fuel manifold can be miniaturized, and which can achieve improvement of cooling efficiency and structural strength of a nozzle neck, and the like, and can apply 3D printing technology.

In order to achieve the objects mentioned above, a combustor according to an embodiment is provided, which may include a nozzle unit including a regenerative cooling channel, in which the nozzle unit may include a fuel manifold outer shell, a combustor inner shell, and a combustor outer shell having a downward channel inlet, and the combustor may include a fuel inlet connected to a nozzle neck of the nozzle unit, a fuel manifold formed between the fuel manifold outer shell and the combustor outer shell, and in which fuel introduced from the fuel inlet flows, a downward channel connected in communication with the fuel manifold through the downward channel inlet, and extending in a downward direction from an upper portion of the combustor, a diverting manifold provided at a distal end of the nozzle unit and connected in communication with the downward channel, and an upward channel connected in communication with the diverting manifold and extending in an upward direction of the combustor.

In addition, the downward channel may be formed between an inner wall of the combustor outer shell and an outer wall of the combustor inner shell, the upward channel may extend upwards and downwards through an inside of the combustor inner shell, and the upward channel and the downward channel may be spaced apart from each other.

In addition, the diverting manifold may be formed in an annular shape, and cause fuel from the downward channel to flow toward the upward channel.

In addition, the fuel manifold outer shell may be connected to the fuel inlet and the combustor outer shell, respectively.

In addition, the upward channel may be branched into first and second upward channels positioned respectively on both sides of the downward channel, and then joined into the single upward channel at a predetermined point.

In addition, the nozzle neck may not be provided with a nozzle neck stiffener for supporting the nozzle neck.

In addition, the downward channel may include an annular portion formed along an inner wall of the combustor outer shell, and a radial portion extending toward the annular portion and positioned between the first and second upward channels.

The combustor of the liquid rocket engine having the configuration described above according to embodiments has the following effects.

In an embodiment, the nozzle neck stiffener for supporting the nozzle neck is not required, and the fuel inlet and the fuel manifold are arranged at the nozzle neck of the nozzle unit where the structure may be the weakest in the nozzle unit to implement a shape that does not require a separate support structure, thereby reducing the weight of the combustor of the liquid rocket engine.

Further, compared to the related combustor in which the manifold is arranged at a lower part of the nozzle unit, i.e., at the expanded nozzle unit, a manifold having a relatively smaller diameter can be used and accordingly, the weight of the fuel manifold itself can also be reduced.

In addition, while it is difficult to apply 3D printing technology to the related combustor that has the fuel manifold located in the expanded nozzle unit and thus has an increased diameter due to the size of the fuel manifold, it is possible to apply the 3D printing technology having size restrictions to the embodiment of the present disclosure and reduce the manufacturing cost.

In addition, since the heat of the nozzle neck can be cooled by introducing fuel through the fuel manifold arranged at the nozzle neck where the most heat is generated, it is advantageous in improving the cooling effect and the structural strength of the nozzle neck.

Meanwhile, although the present disclosure is not explicitly described, it also includes other effects that can be expected from the configuration described above.

BRIEF DESCRIPTION OF THE DRAWINGS

Embodiments of the present disclosure will be described with reference to the accompanying drawings described below, in which like reference numerals denote like elements, but are not limited thereto, in which.

DETAILED DESCRIPTION

Hereinafter, preferred embodiments of the present disclosure will be described in detail with reference to the accompanying drawings, that will be readily apparent to those skilled in the art to which the present disclosure pertains. However, the description proposed herein is just a preferable example for the purpose of illustrations only, not intended to limit the scope of the disclosure, so it should be understood that other equivalents and modifications could be made thereto without departing from the scope of the disclosure.

Figure 1:
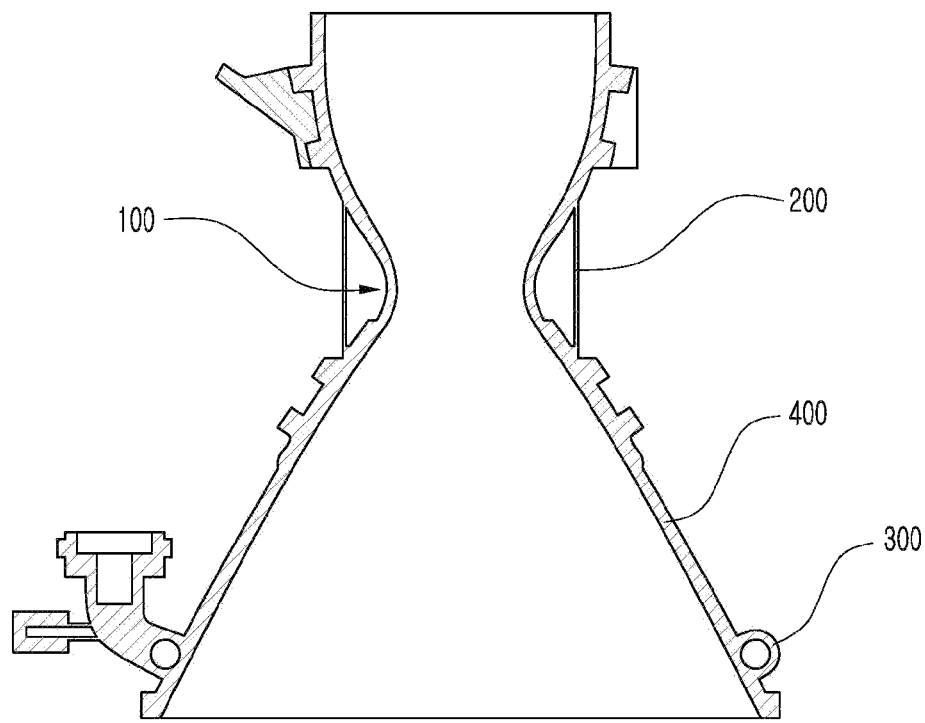
FIG. 1 is a schematic diagram illustrating a prior art of a combustor of a liquid rocket engine.
Figure 2:
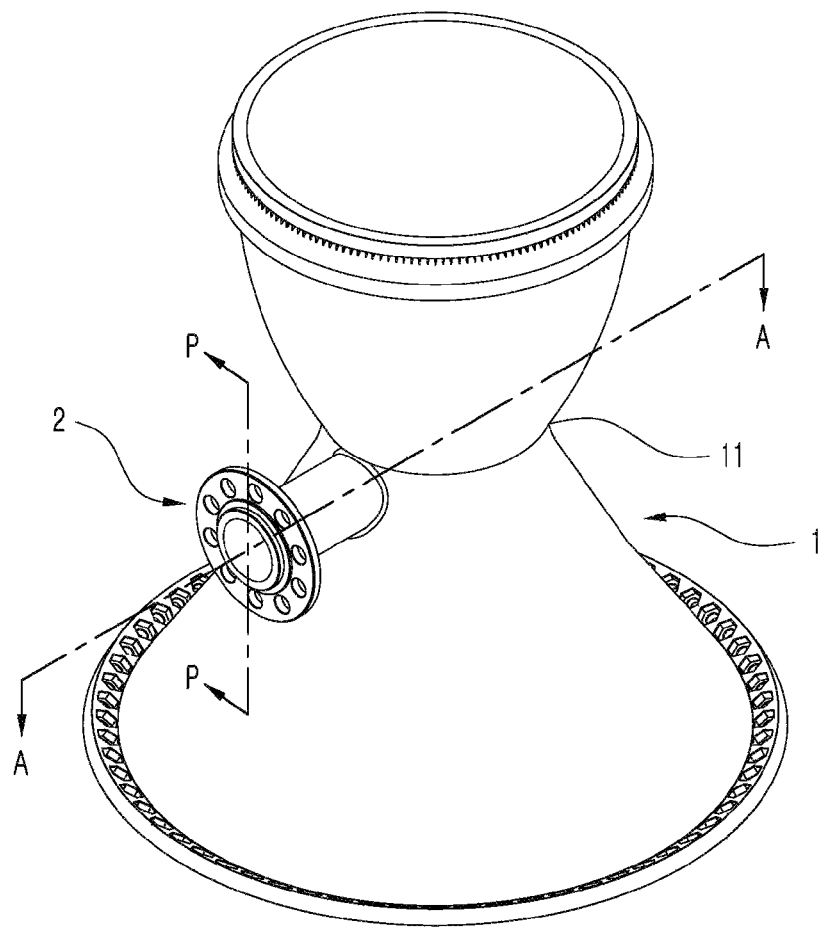
FIG. 2 is a schematic diagram illustrating a combustor of a liquid rocket engine according to an embodiment of the present invention.
Figure 3:
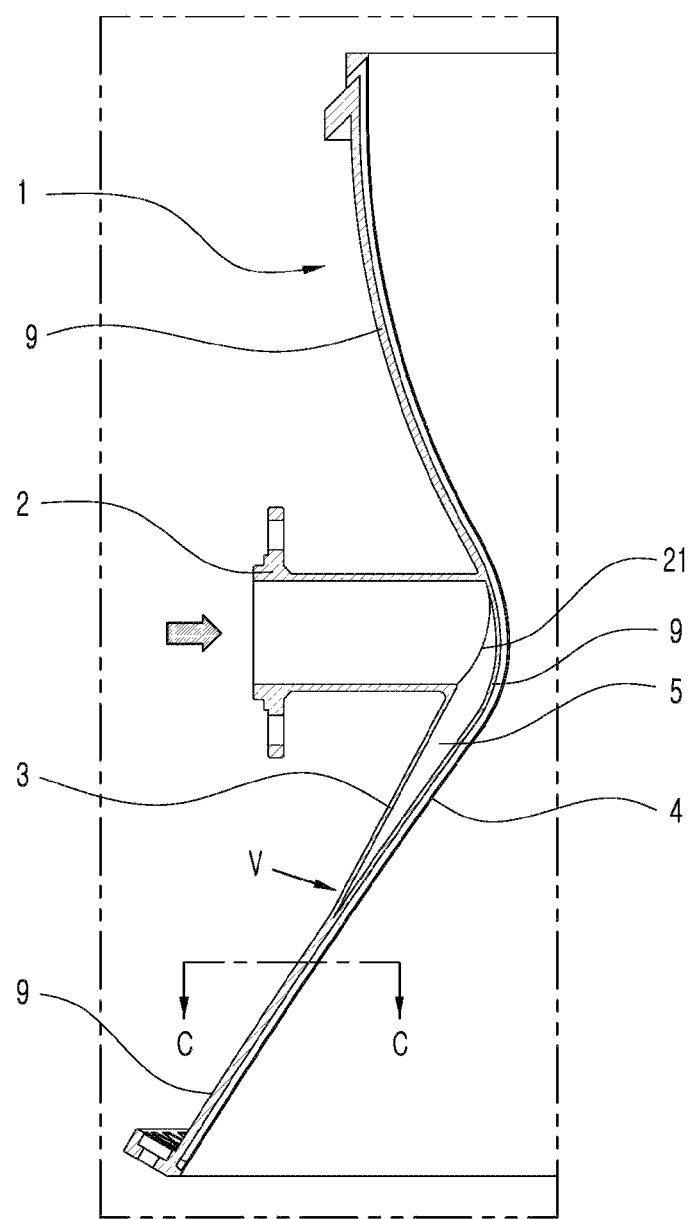
FIG. 3 is a partial cross-sectional view illustrating the combustor in the direction P-P of FIG. 2.

As illustrated in FIGS. 2 and 3, a combustor of a liquid rocket engine according to an embodiment (hereinafter referred to as "combustor of liquid rocket engine") includes a nozzle unit 1 having a regenerative cooling channel.

In the combustor of liquid rocket engine, the nozzle unit 1 includes a fuel manifold outer shell 3, a combustor inner shell 4, and a combustor outer shell 9 having a downward channel inlet 92.

In addition, as illustrated in FIGS. 2, 3, 7, 8, and the like, the combustor of liquid rocket engine includes a fuel inlet 2, a fuel manifold 5, a downward channel 6, a diverting manifold 7, and an upward channel 8.

In particular, in an embodiment, a nozzle neck 11 is not provided with a nozzle neck stiffener for supporting the nozzle neck 11, and the fuel inlet 2 is connected to the nozzle neck 11 of the nozzle unit 1. Specifically, as illustrated in FIGS. 3 and 5, the fuel inlet 2 is connected to the fuel manifold outer shell 3 such that an outlet 21 of the fuel inlet 2 is connected in communication with the fuel manifold 5.

As described above, the related combustor is provided with the nozzle neck stiffener for supporting the nozzle neck and prevent the nozzle neck having a small diameter from being damaged by engine vibration, and the bell-type expanded nozzle unit includes the donut-shaped fuel manifold. However, in an embodiment, the nozzle neck stiffener for supporting the nozzle neck 11 is not required, and the fuel inlet 2, the fuel manifold 5, and the fuel manifold outer shell 3 are arranged at the nozzle neck 11 where the structure may be weakest in the nozzle unit 1, thereby achieving the function of the related nozzle neck stiffener. Accordingly, the weight of the combustor of the liquid rocket engine can be reduced according to the removal of the nozzle neck stiffener, and compared to the related combustor in which the manifold is arranged at a lower part of the nozzle unit, i.e., at the expanded nozzle unit, a manifold having a relatively smaller diameter can be used and accordingly, the weight of the fuel manifold itself can also be reduced.

In addition, while it is difficult to apply 3D printing technology to the related combustor that has the fuel manifold located in the expanded nozzle unit and thus has an increased diameter due to the size of the fuel manifold, it is possible to apply the 3D printing technology to the embodiment of the present disclosure and reduce the manufacturing cost. In addition, by introducing fuel through the fuel manifold disposed at the nozzle neck where generally the most heat is generated, the heat of the nozzle neck can be cooled, and accordingly, it is more advantageous in improving the cooling effect and the structural strength of the nozzle neck.

Figure 4:
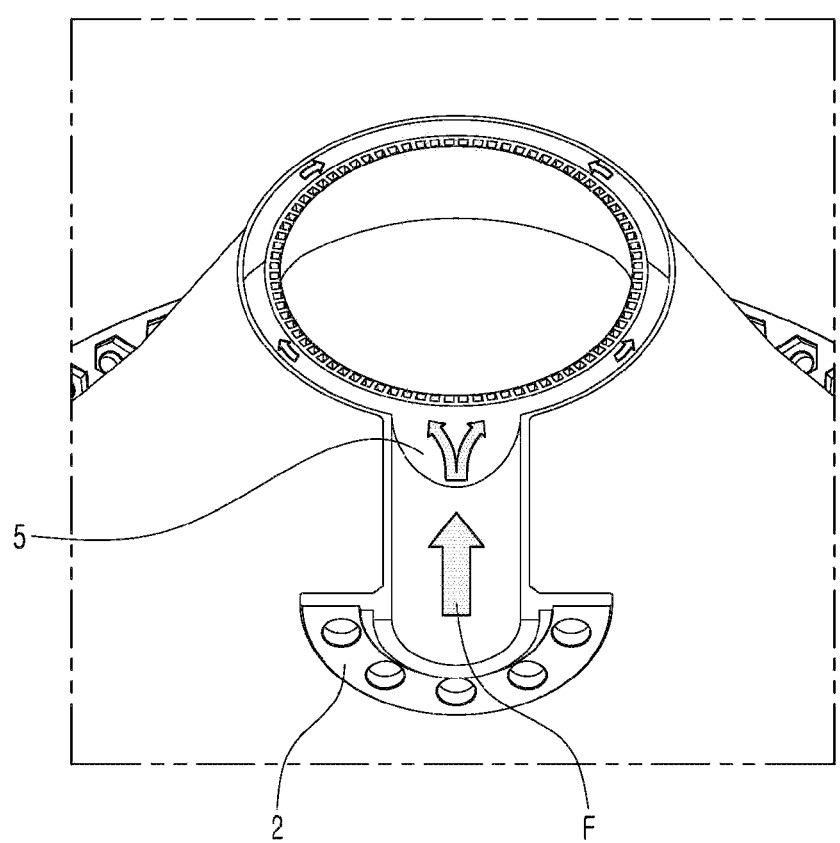
FIG. 4 is a cross-sectional view illustrating the combustor taken along the line A-A of FIG. 2.
Figure 5:
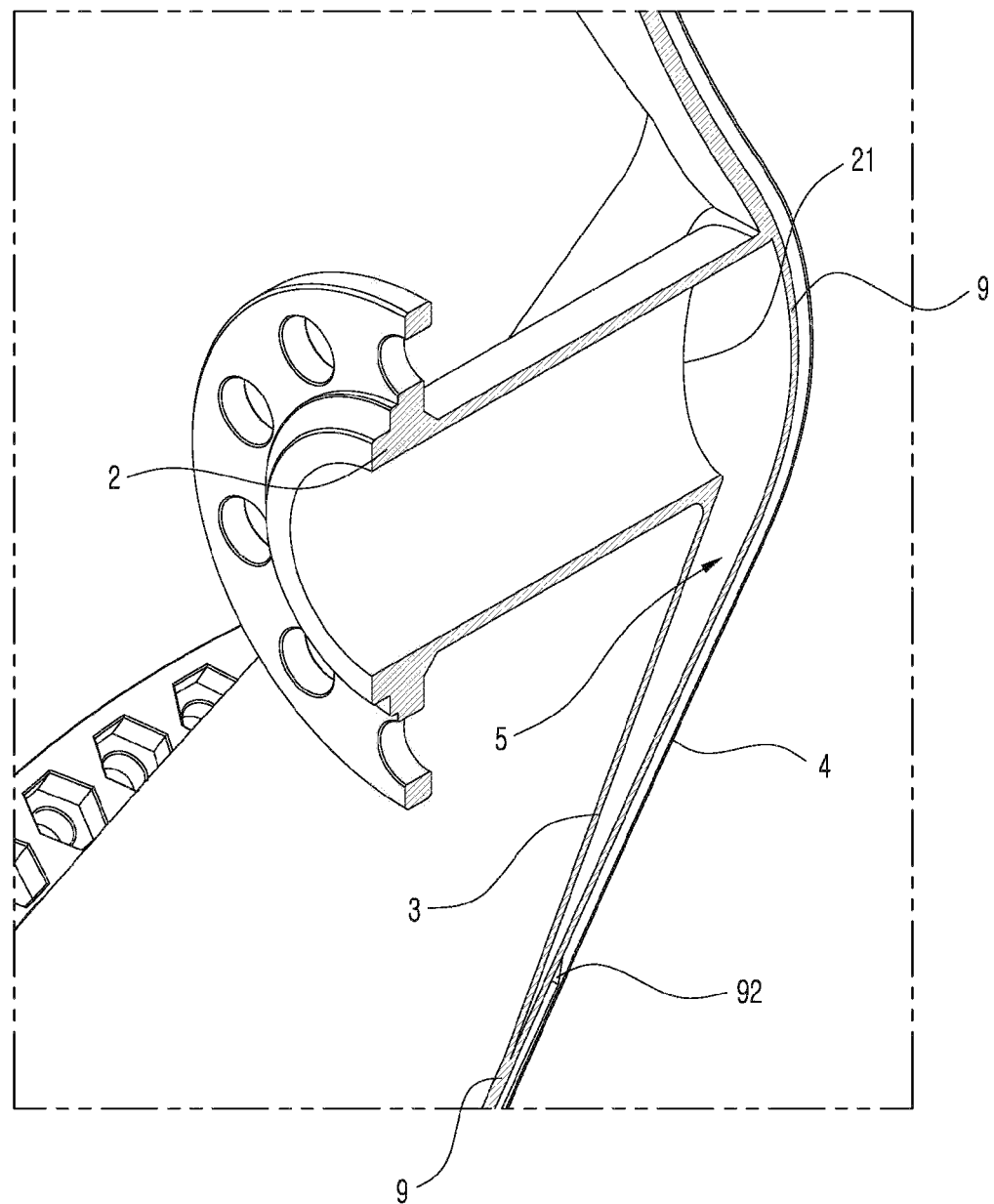
FIG. 5 is an enlarged perspective cross-sectional view illustrating the vicinity of a fuel manifold of the combustor of FIG. 2.

Meanwhile, as illustrated in FIGS. 3 to 5, the fuel manifold 5 is formed between the fuel manifold outer shell 3 and the combustor outer shell 9, and fuel F is introduced through the fuel inlet 2 and flows.

The fuel manifold outer shell 3 is connected to the fuel inlet 2 and the combustor outer shell 9, respectively.

Figure 6:
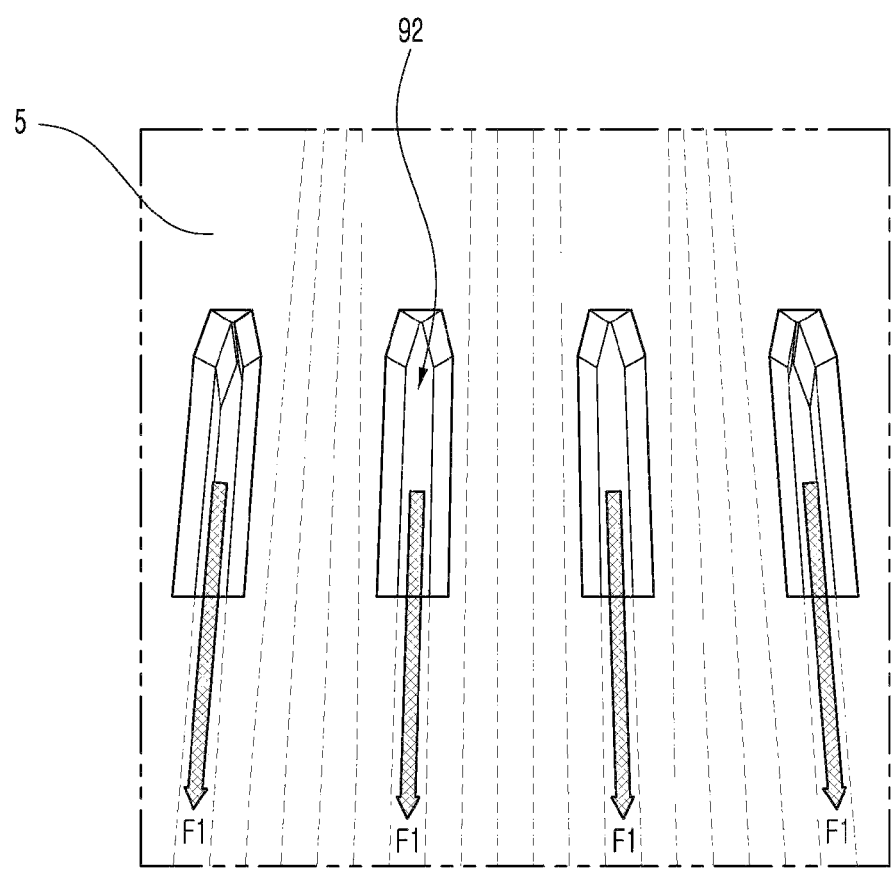
FIG. 6 is a partially enlarged view illustrating an encircled portion W of FIG. 9, and is a schematic diagram illustrating a downward channel inlet positioned approximately at a point V of FIG. 3.
Figure 7:
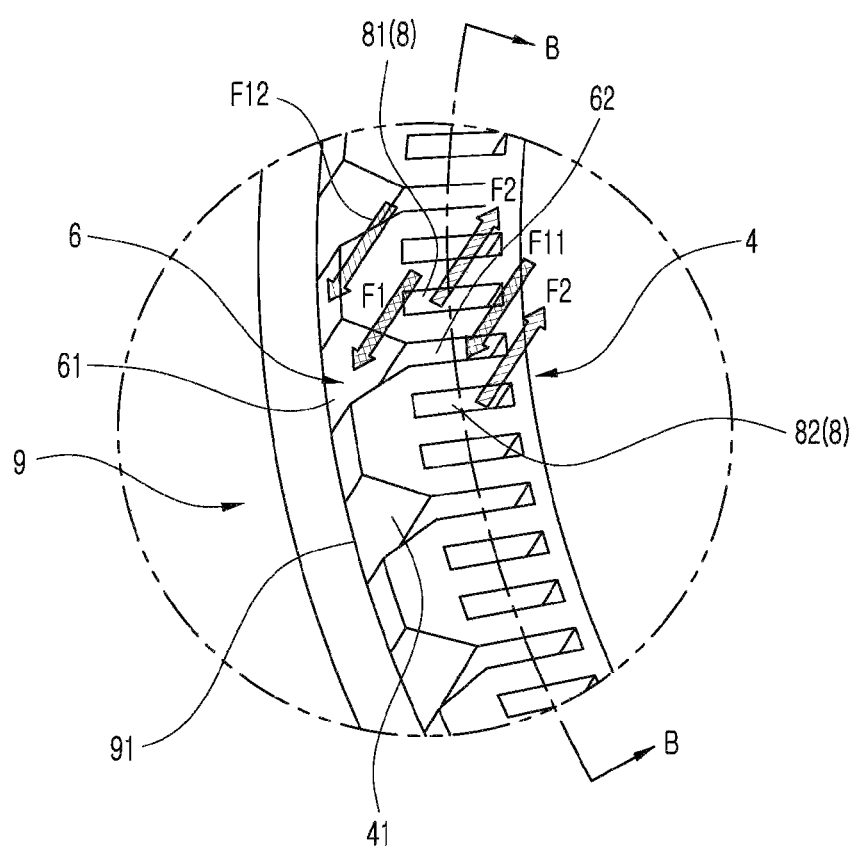
FIG. 7 is a perspective cross-sectional view illustrating a downward channel and an upward channel when viewed from a cross section taken along the line C-C of FIG. 3.

As illustrated in FIGS. 6 and 7, the downward channel 6 is connected in communication with the fuel manifold 5 through the downward channel inlet 92 and extends from an upward direction of the combustor (upper direction based on FIGS. 3 and 6) to a downward direction (lower direction based on FIGS. 3 and 6). The fuel introduced through the fuel inlet 2 flows into the downward channel 6 through the downward channel inlet 92 and flows in a downward direction of the combustor (F1). Specifically, as illustrated in FIG. 7, when viewed in the cross section taken along the line C-C of FIG. 3, the downward channel 6 is formed between an inner wall 41 of the combustor inner shell 4 and an inner wall 91 of the combustor outer shell 9.

In addition, as illustrated in FIG. 7, the downward channel 6 includes an annular portion 61 formed along the inner wall 91 of the combustor outer shell 9, and a radial portion 62 extending toward the annular portion 61 and positioned between first and second upward channels 81 and 82. With the annular portion 61, it is possible to facilitate the flow of fuel in the downward direction of the combustor as much as possible (F12), and through the radial portion 62, it is also possible to contribute to the cooling of the combustor (F11).

Figure 8:
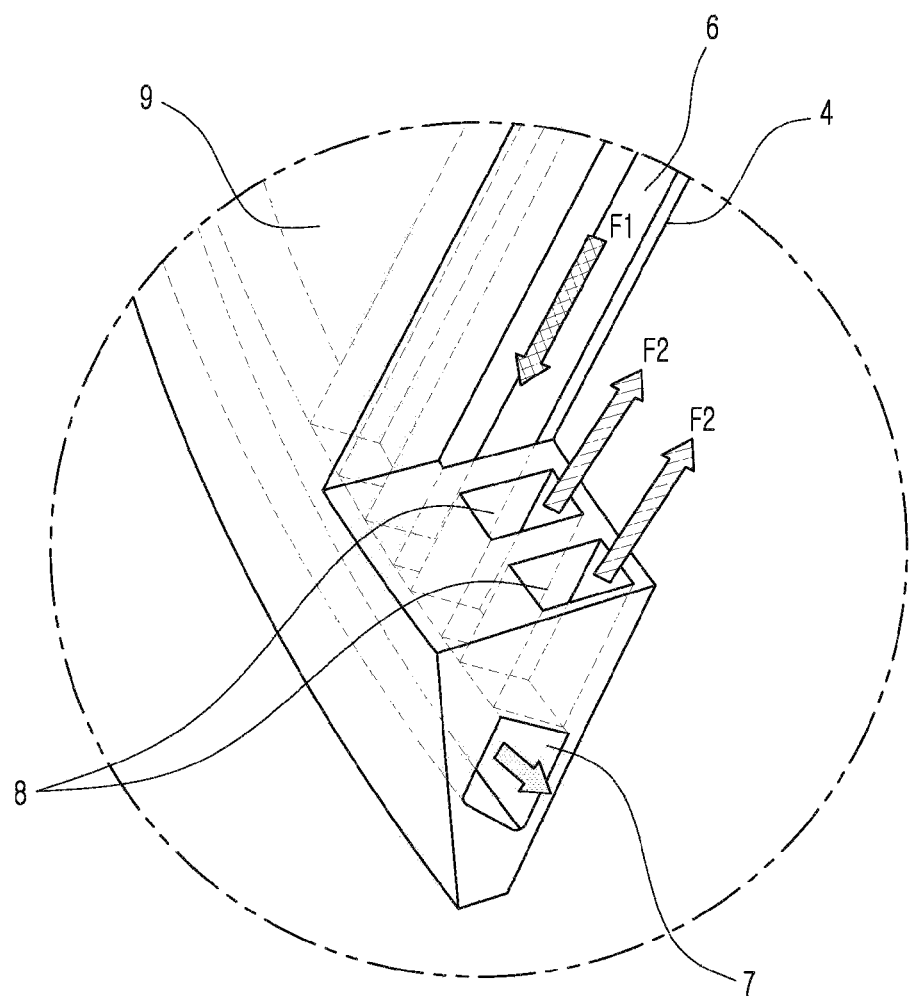
FIG. 8 is a perspective cross-sectional view illustrating the vicinity of a diverting manifold of the combustor of FIG. 2.
Figure 9:
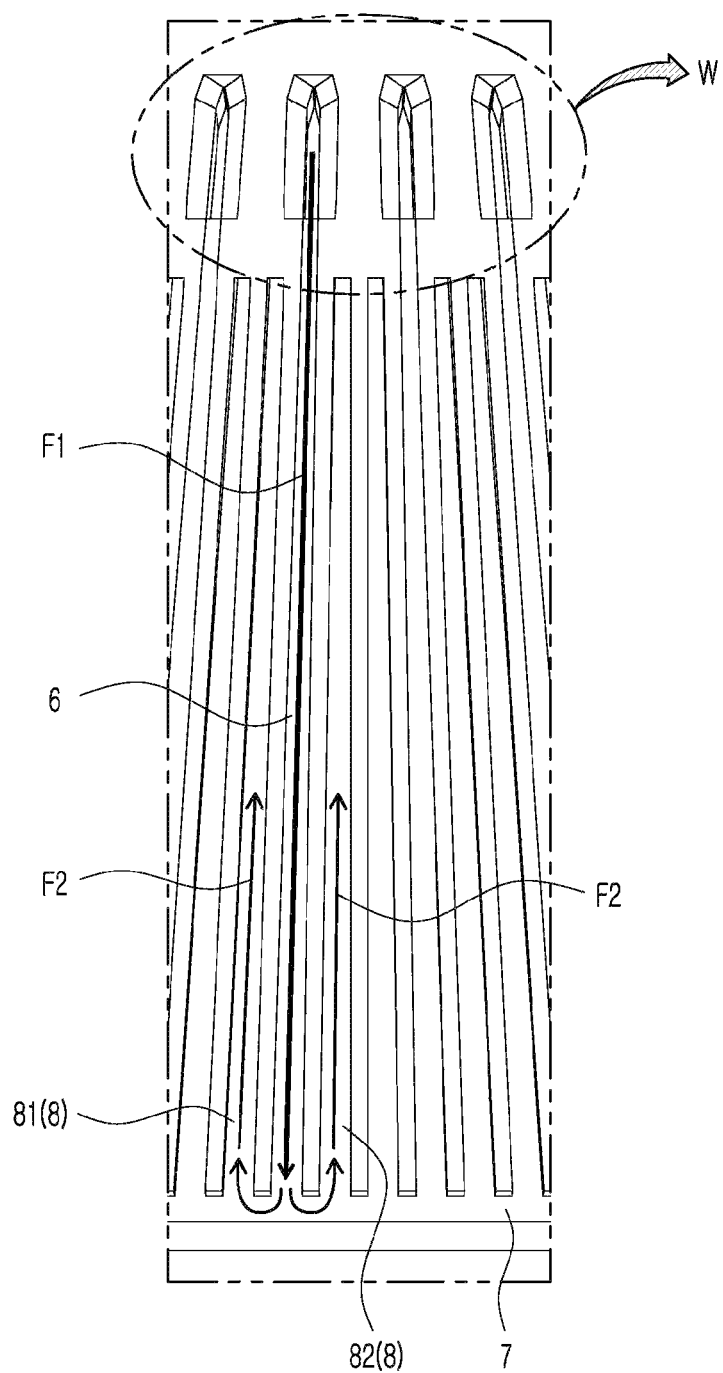
FIGS. 9 and 10 are schematic diagrams of a flow of fuel in the nozzle unit of the combustor of FIG. 2.
Figure 10:
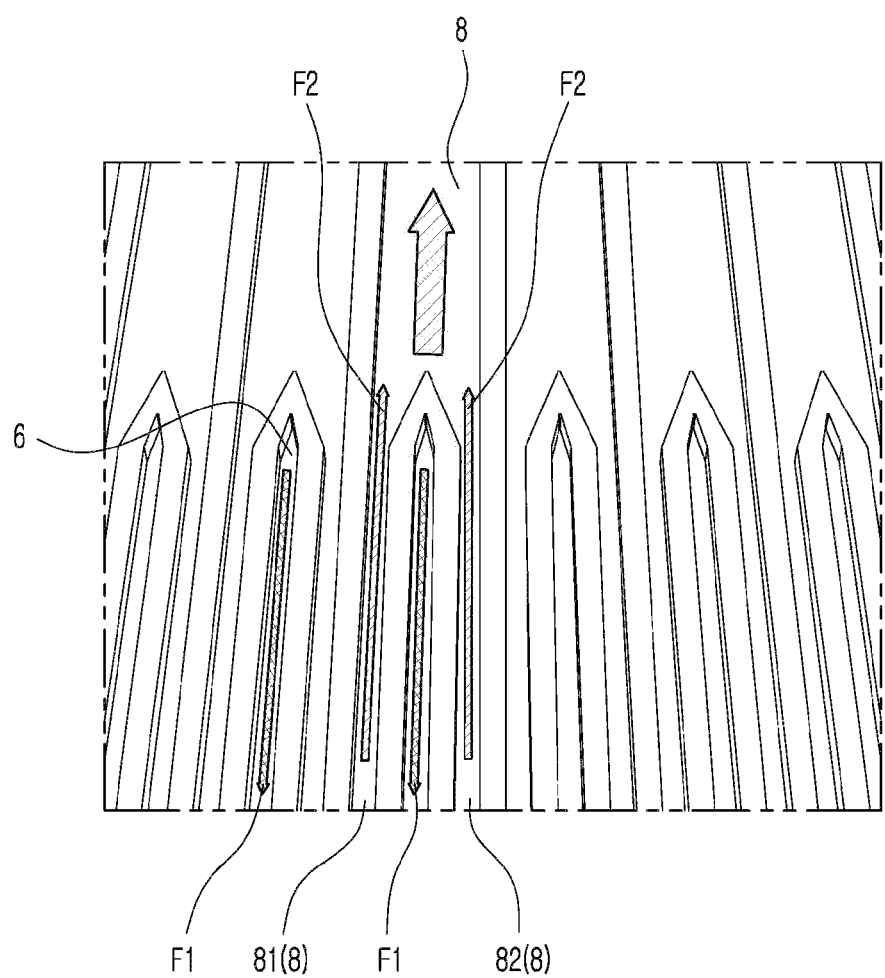

As illustrated in FIGS. 8 and 9, the diverting manifold 7 is formed at a distal end of the nozzle unit 1 and is connected in communication with the downward channel 6. Specifically, the diverting manifold 7 is formed in an annular shape along the periphery of the distal end of the nozzle unit, and redirects the inflow of fuel from the downward channel 6 toward the upward channel 8.

As illustrated in FIGS. 7 to 10, the upward channel 8 is connected in communication with the diverting manifold 7, and extends in the upward direction of the combustor. Specifically, as illustrated in FIG. 7, when viewed in the cross section taken along the line C-C of FIG. 3, the upward channel 8 extends through the inside of the combustor inner shell 4 upwards and downwards. For example, the upward channels 81, 82:8 are positioned one on each of both sides of each downward channel 6 (see FIG. 9). That is, the fuel introduced into the downward channel 6 is branched into the first and second upward channels 81 and 82 respectively positioned on both sides of each downward channel 6 and flows to the upper part of the combustor (F2). In addition, at a predetermined point, these branched first and second upward channels 81 and 82 are joined into the single upward channel 8 (see FIG. 10).

Meanwhile, the upward channel 8 and downward channel 6 are formed to be spaced apart from each other such that fuel flowing in each channel does not flow into the other adjacent channels.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

The invention claimed is:

1. A combustor of a liquid rocket engine comprising a nozzle unit including a regenerative cooling channel, wherein
   the nozzle unit comprises a fuel manifold outer shell, a combustor inner shell, and a combustor outer shell having a downward channel inlet, and
   the combustor comprises:
      a fuel inlet connected to a nozzle neck of the nozzle unit;
      a fuel manifold formed between the fuel manifold outer shell and the combustor outer shell, and in which fuel introduced from the fuel inlet flows;
      a downward channel connected in communication with the fuel manifold through the downward channel inlet, and extending in a downward direction from an upper portion of the combustor;
      a diverting manifold provided at a distal end of the nozzle unit and connected in communication with the downward channel; and
      an upward channel connected in communication with the diverting manifold and extending in an upward direction of the combustor,
   wherein the downward channel is formed between an inner wall of the combustor outer shell and an outer wall of the combustor inner shell,
   the upward channel extends upwards and downwards through an inside of the combustor inner shell, and
   the upward channel and the downward channel are spaced apart from each other,
   wherein the upward channel is branched into first and second upward channels positioned respectively on both sides of the downward channel, and the first and second upward channels are then joined into a single upward channel at a predetermined point, and
   wherein the downward channel includes:
      an annular portion formed along an inner wall of the combustor outer shell; and
      a radial portion extending toward the annular portion and positioned between the first and second upward channels.

2. The combustor according to claim 1, wherein the diverting manifold is formed in an annular shape, and causes fuel from the downward channel to flow toward the upward channel.

3. The combustor according to claim 1, wherein the fuel manifold outer shell is connected to the fuel inlet and the combustor outer shell, respectively.

4. The combustor according to claim 1, wherein the nozzle neck is not provided with a nozzle neck stiffener for supporting the nozzle neck.

* * * * *